June 9, 1959  J. H. CLARK ET AL  2,889,944
LOADER
Filed July 24, 1956  2 Sheets-Sheet 1
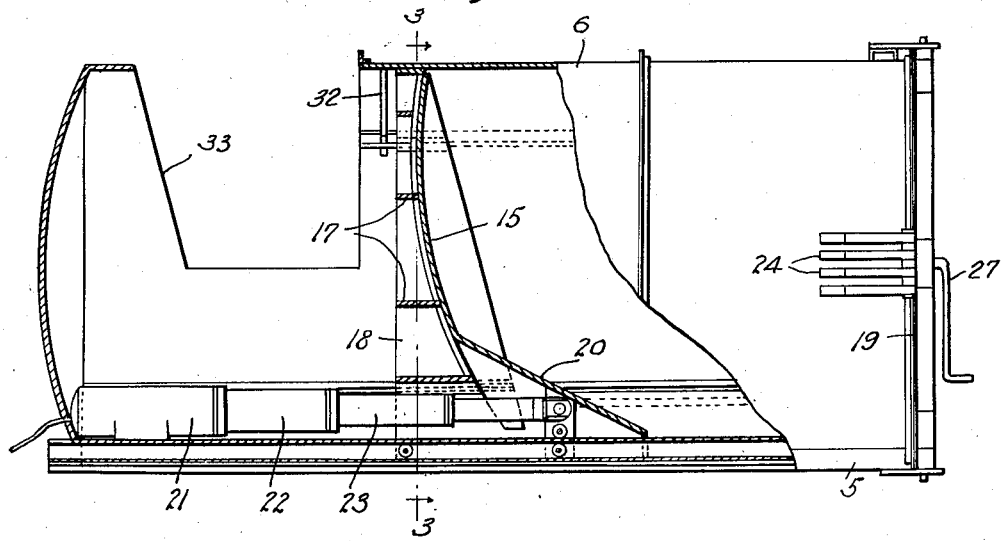
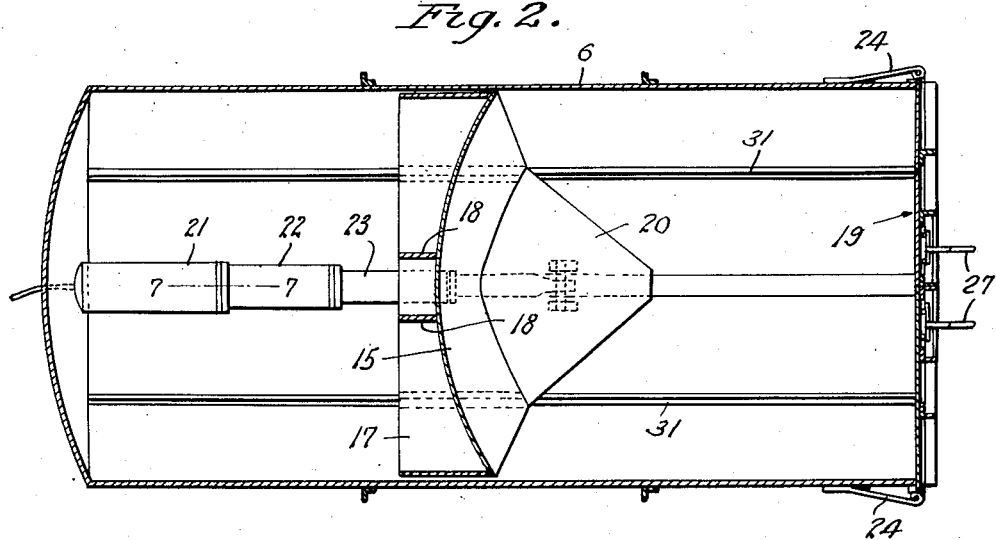
J. H. Clark
A. R. Baird
INVENTORS.
BY *CA Snow &Co.*
ATTORNEYS.

June 9, 1959  J. H. CLARK ET AL  2,889,944
LOADER
Filed July 24, 1956  2 Sheets-Sheet 2
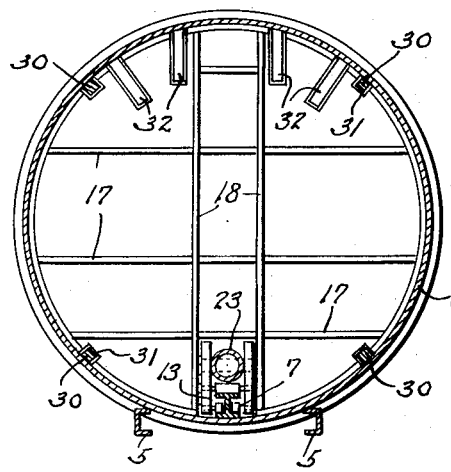
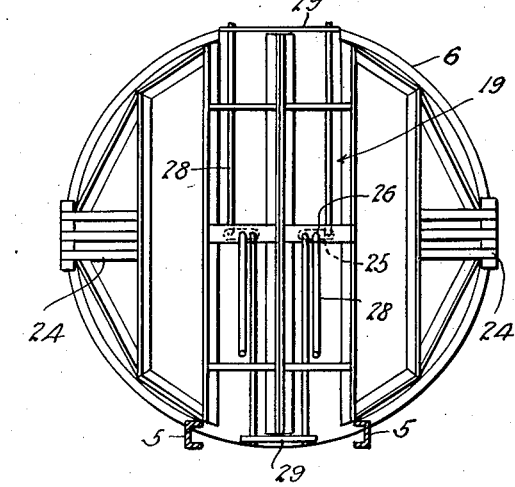
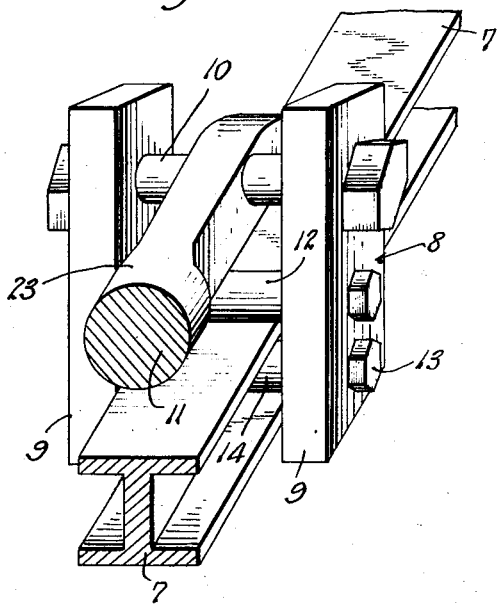
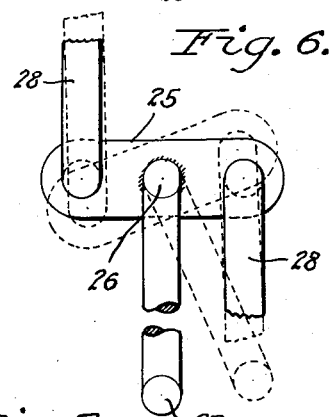
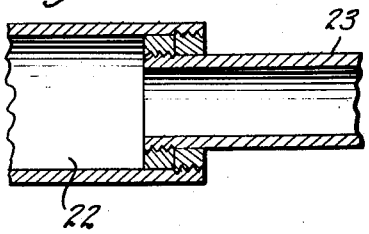
J. H. Clark
A. R. Baird
INVENTORS
BY *C. A. Snow & Co.*
ATTORNEYS.

United States Patent Office 2,889,944
Patented June 9, 1959

2,889,944
LOADER

Jonathan H. Clark and Art Ray Baird, Pomona, Calif.

Application July 24, 1956, Serial No. 599,790

1 Claim. (Cl. 214—82)

This invention relates to truck bodies, and particularly to truck bodies designed for collecting trash, garbage or the like material, the primary object of the invention being to provide mechanism including a vertical horizontally sliding compression plate movable throughout the length of the truck body for pressing the material against the end gate of the truck and to force the material from the truck, when the end gate has been moved to its open position.

An important object of the invention is to provide a truck wherein the compression plate is so constructed and arranged that the contents of the truck will be directed upwardly towards the top of the truck, thereby preventing the packing of the material at the floor of the truck, and consequently increasing the amount of load to the maximum.

Still another object of the invention is to provide a compression plate which is slightly inclined to cause the compression plate to be operated with the minimum amount of resistance, resulting in a decided reduction in the amount of power required in operating the compression plate.

Other and further objects and advantages of the invention will be hereinafter described and the novel features thereof defined in the appended claim.

Referring to the drawings:

Fig. 1 is a side elevational view of a truck body constructed in accordance with the invention, portions of the side wall of the truck body having been broken away illustrating the compression plate movable longitudinally of the body.

Fig. 2 is a longitudinal sectional view through the truck body.

Fig. 3 is a sectional view taken on line 3—3 of Fig. 1.

Fig. 4 is a rear end elevational view of the truck body.

Fig. 5 is an enlarged detailed view illustrating the connection between the telescoping connector between the compression plate and front end of the body of the truck.

Fig. 6 is a side elevational view of the end gate locking means.

Fig. 7 is a sectional view taken on line 7—7 of Fig. 2.

Referring to the drawings in detail, the truck comprises parallel channel beams 5 that have their ends mounted on the trucks of the truck body and on which the wheels are mounted.

These beams provide the support for the body 6 of the truck, which is circular in cross section and of the desired length to extend between the wheel supported trucks of the truck body.

Mounted on the truck and extending longitudinally of the body, is an I beam 7 that extends throughout the length of the body 6 and arranged in parallel relation with the longitudinal center of the body.

This I beam 7 provides a support for the carriage 8 that comprises side plates 9 connected adjacent to their upper ends by the shaft 10 which shaft provides connecting means between the carriage 8 and the telescoping operating mechanism 11.

A second shaft 12 connects with the plates 9 below the shaft 10, and rests on the upper surface of the I beam 7. Shafts 13 are secured to the plates 9, the inner ends of the shafts 13 being disposed between the flanges of the I beam 7 at opposite sides thereof. Rollers 14 are mounted on the inner ends of the shafts 13 and roll on the lower flanges of the I beam 7, as better shown by Fig. 3 of the drawings.

Disposed within the body 6, is a compression plate 15, which plate is circular in formation and is of a diameter to fit within the circular body of the truck. The compression plate is mounted on the frame 16 embodying transverse bars 17 and spaced vertical bars 18. The bars 17 and 18 are so arranged that the compression plate 15 is dished on the side adjacent to the end gate 19, so that the compression plate will have a scooping effect when it is moved against the material contained in the truck body, to force the material towards the end gate.

Forming a part of the compression plate, is an inclined plate 20 that extends rearwardly towards the end gate, so that as the compression plate is moved towards the end gate in compressing material to pack the material in the body, the inclined plate 20 will have an elevating effect on the material contained within the body portion thereby to elevate the material towards the top of the body 6. With this inclined plate it will therefore provide means for preventing the collection of the material on the floor of the body of the truck to defeat the purpose of the compression plate.

The telescoping operating mechanism includes the telescoping sections 21, 22 and 23 which are fluid controlled so that the operation of the telescoping operating mechanism may be regulated and controlled by an operator manipulating a control valve not shown, and which is connected with usual hydraulic system of trucks of this character.

The end gate 19 is connected with the body 6, by hinges 24 that are of the conventional structure, and permit the end gate 19 to be swung from its open position to its closed position or vice versa, in the usual manner. The end gate locking means comprises a bar 25 secured in a horizontal shaft 26 that is pivotally mounted on one of the end gate sections. One end of said shaft 26 is formed into a handle 27 for use in rotating said shaft to lock or unlock the end gate.

Sliding bolts 28 are pivotally connected to the bar 25 adjacent to the end thereof the sliding bolts operating simultaneously to lock or unlock the end gate according to the direction of rotation of said handle and shaft. The free ends of the sliding bolts move into openings formed in the stationary keeper plates 29 secured to the rear end of the body, securing said end gate in a closed position.

In order that the compression plate will be held against lateral movement within the body, radial thrust bearings 30 extend inwardly from the wall of the body 6, and are disposed in grooves 31 formed in the edge of the compression plate 15, as better shown in Fig. 3 of the drawings.

Spring fingers 32 are also extended inwardly from the wall of the body 6 adapted to contact the load as the compressor plate 15 moves under the loading opening 33 in one direction and hold the load intact to facilitate the operation of the compression plate.

From the foregoing it will be seen that due to the construction shown and described, I have provided a truck designed primarily for collecting trash, garbage or the like material, the truck being provided with a compression plate with means to move the compression plate longitudinally of the body of the truck to compress the material contained in the truck when the truck is being loaded, and to force the material from the truck when the truck has been transported to its place of deposit, and the gate of the truck has been opened.

It might be further stated that the body of the truck is formed with a cutout portion indicated by the reference character 33, which constitutes the loading opening of the truck. The construction of the compression plate is such that it may be moved to a position clear of the opening at the front end of the body to permit the material to be placed in the truck body. After the material has been deposited in the truck body, the mechanism is operated to move the compression plate rearwardly towards the end gate, compressing or discharging the material as previously described.

Having thus described the invention what is claimed is:

A dump truck comprising a truck body having a movable end gate, said truck body having a loading opening in the wall thereof adjacent to the front end of the truck body, a circular concavo convex forwardly inclined compression plate fitted within said truck body in contact with the wall of the truck body, said compression plate having its concave surface facing the end gate adapted to pick up material and force the material towards the end gate upon movement of the compression plate in one direction, and spring members extending inwardly from the wall of the body adjacent the opening and engagable with the load to prevent discharge of material through the opening, upon movement of said compression plate beyond the opening in said one direction.

References Cited in the file of this patent

UNITED STATES PATENTS

| | | |
|---|---|---|
| 1,908,899 | Kayel | May 16, 1933 |
| 2,557,003 | Le Laurin | June 12, 1951 |
| 2,643,014 | Calcagno | June 23, 1953 |
| 2,696,925 | Le Laurin | Dec. 14, 1954 |
| 2,741,375 | Backes | Apr. 10, 1956 |
| 2,750,055 | Huffines | June 12, 1956 |
| 2,800,234 | Herpich et al. | July 23, 1957 |